Sept. 23, 1930.    G. F. DODGE    1,776,419
DRIVE MECHANISM FOR CONVEYER BELTS
Filed Oct. 9, 1928    2 Sheets-Sheet 1

Inventor
Gordon F. Dodge
by his Attorney
John R. Nolan

Sept. 23, 1930.  G. F. DODGE  1,776,419
DRIVE MECHANISM FOR CONVEYER BELTS
Filed Oct. 9, 1928   2 Sheets-Sheet 2
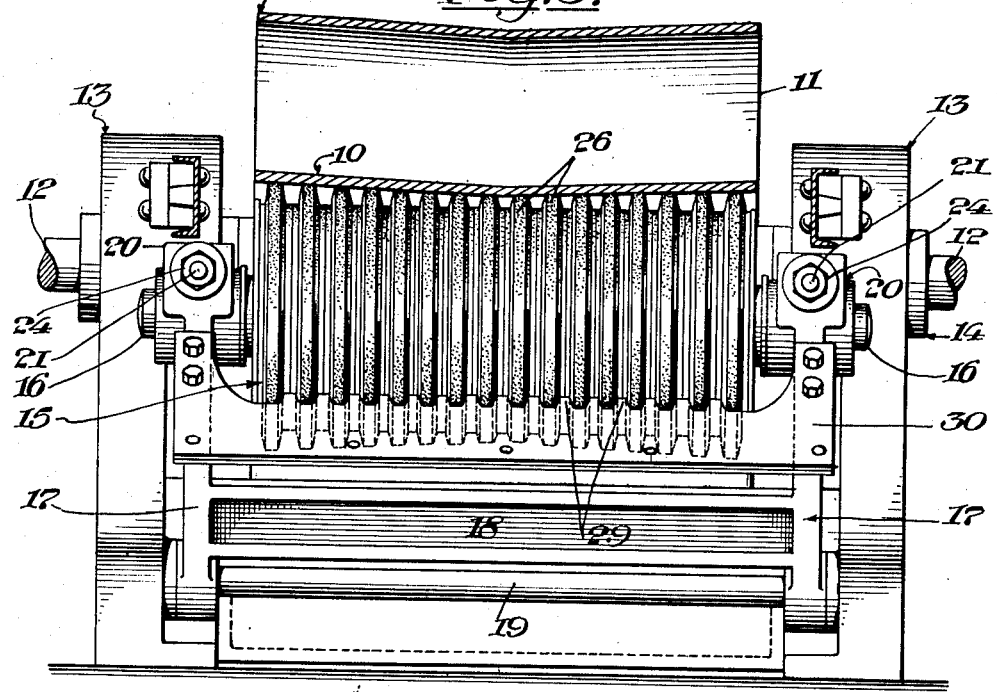
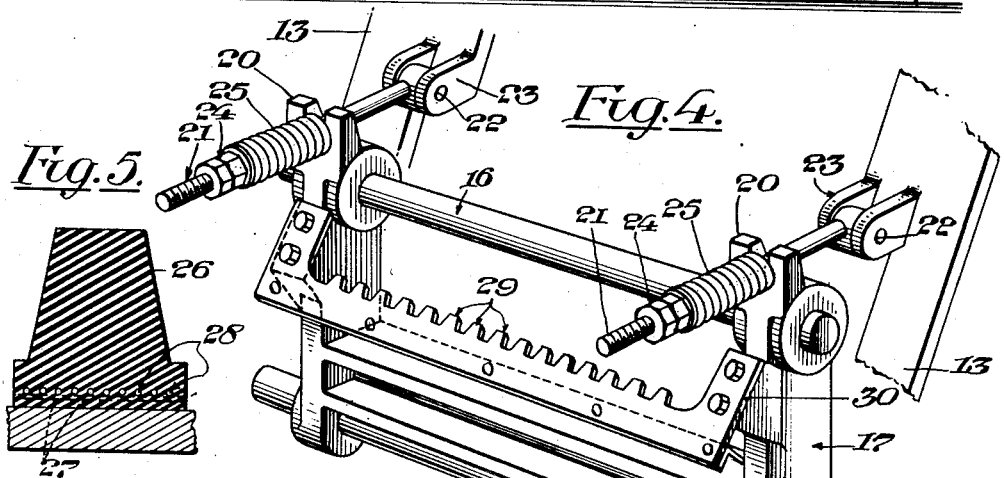
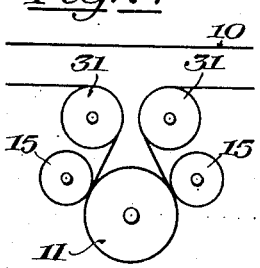
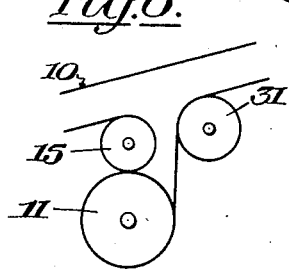
Inventor
Gordon F. Dodge
by his Attorney
John T. Nolan Patented Sept. 23, 1930

1,776,419

UNITED STATES PATENT OFFICE

GORDON F. DODGE, OF NEW YORK, N. Y., ASSIGNOR TO ROBINS CONVEYING BELT COMPANY, OF PASSAIC, NEW JERSEY, A CORPORATION OF NEW JERSEY

DRIVE MECHANISM FOR CONVEYER BELTS

Application filed October 9, 1928. Serial No. 311,299.

This invention relates to drive mechanism for long endless conveyer belts adapted to transport materials, in bulk, between distant points. The primary object of the invention is to provide a simple and efficient construction which, without increasing the unit stress in the belt, produces direct pressure between the belt and the drive pulley in such a manner as to obviate the requirement of slack side tension of the belt for effecting the operative adhesion of the latter to the pulley, thereby making the whole tension value of the belt available for doing useful work. This results either in a thinner belt for a given duty or a possible longer conveyer with a given belt.

Another object of the invention is to provide a drive mechanism of the character mentioned, which, being applicable to the head drive pulley of a conveyer, provides a compact and economical construction wherein less pulleys and less bends of the belt are required than in mechanisms heretofore designed to increase the frictional contact between the return run of the belt and a drive pulley. The present device thus not only cheapens the installation as compared with the previous mechanism referred to, but it also reduces the maintenance cost including that incident to the wear of the bearings.

A further object of the invention is to provide a drive mechanism wherein the pressure of the conveyer belt against the drive pulley can be readily adjusted to meet specific requirements, and wherein also the pressure can be relieved and removed to permit the replacement of the conveyer belt when it is worn out.

A still further object of the invention is to provide, in a conveyer belt drive mechanism, a novel peripheral construction of tension pulley which automatically adapts itself to the contour of the opposing surface of the belt as determined by the surface of the drive pulley, thereby overcoming the effect of differential action incident to the crowning of the drive pulley, and which peripheral construction is also effective to remove material which may adhere thereto.

With these and other objects in view, my invention, broadly considered, consists in the combination with a conveyer drive pulley and belt, of a tension pulley arranged and adapted to co-act with said drive pulley and belt to effect between them a pressure which produces frictional action equivalent to the ordinary slack side pull of the belt, thereby reducing such pull to zero, and rendering available for useful work all the inherent strength of the conveyer belt. The tension pulley may be placed at almost any convenient point around the drive pulley but it is obvious that the greater the arc of contact between the belt and driving pulley the more efficient will be the device and the less the pressure required.

More specifically, the invention embodies a spring-pressed tension pulley mounted to swing in close relation to the surface of the drive pulley and including an assemblage of rubber cushion rings which present to the belt a surface conforming to that of the drive pulley and being arranged and adapted to produce the necessary frictional contact between said belt and drive pulley.

The invention also comprises novel features of construction and combinations of parts which will be hereinafter described; the scope of the invention then being defined in the appended claims.

In the drawings—

Fig. 3 is a similar section, as on the line 3—3 of Fig. 1.

Fig. 4 is a perspective view of a swinging frame structure for the tension pulley.

Fig. 5 is a section, enlarged, through the periphery of the tension pulley.

Figs. 6 and 7 are diagrams illustrating modifications of the invention for use as an internal drive on a non-reversing and reversing conveyer, respectively.

Figure 1:
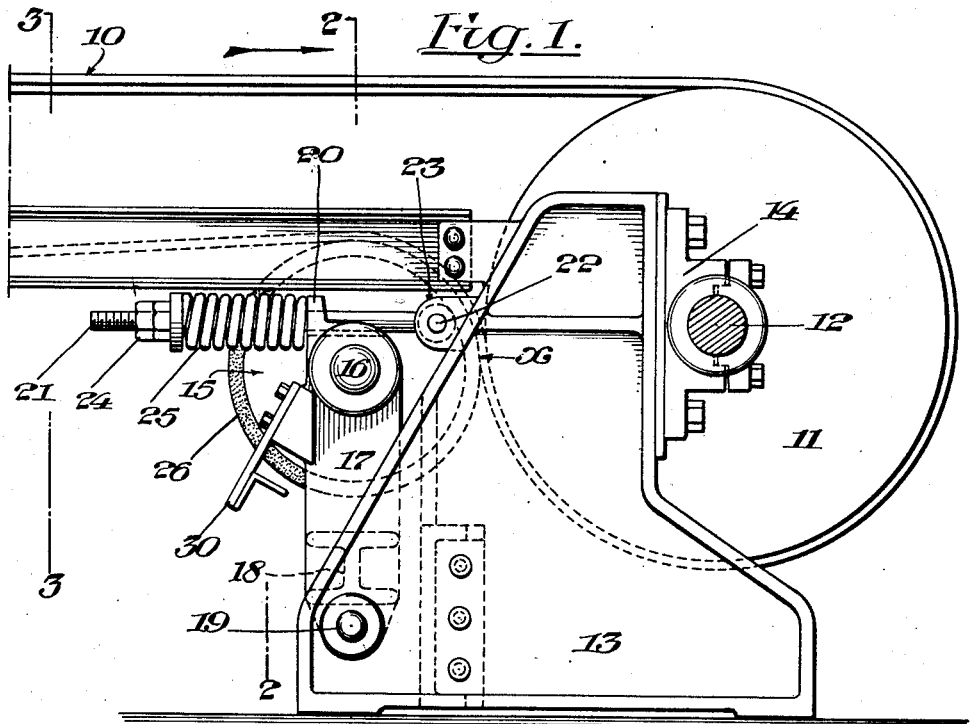
Figure 1 is a side elevation of a conveyer belt drive mechanism embodying a preferred form of my invention.
Figure 2:
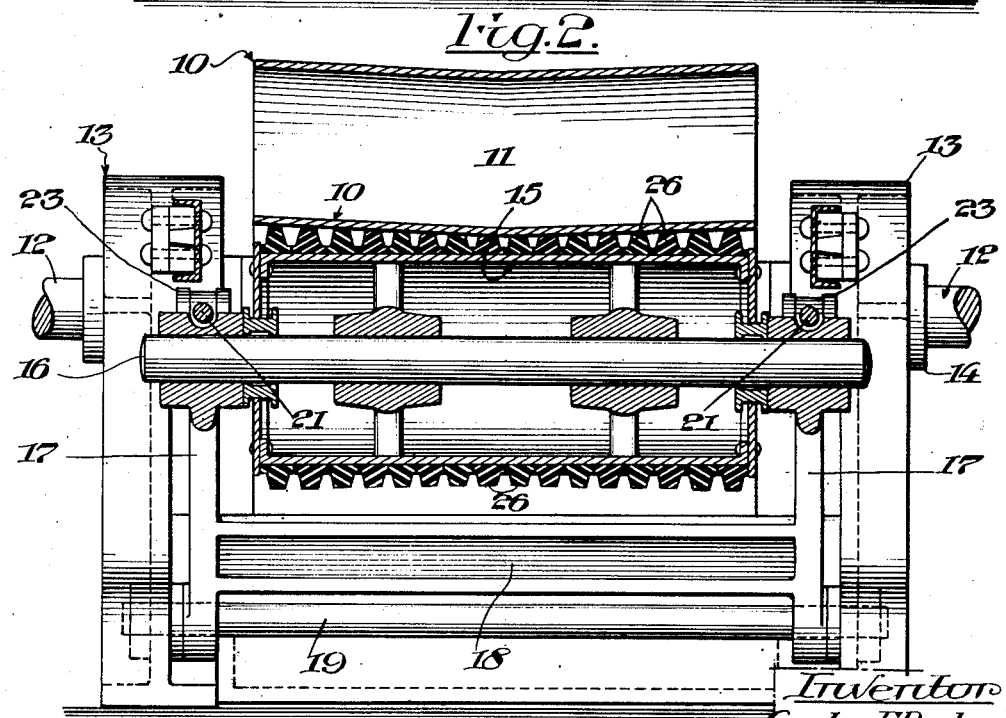
Fig. 2 is a transverse vertical section of the drive, as on the line 2—2 of Fig. 1.

Referring to the drawings, 10 designates a portion of an endless conveyer belt; 11 a crowned head-drive pulley therefor; 12 a drive shaft from the pulley, and 13 a supporting frame having bearings 14 in which the shaft is journaled. The base of the frame may be set at different angles to adapt it to any permissible working angle of the conveyer.

A tension pulley 15, which is mounted rearward of and is movable toward and from the periphery of the drive pulley, deflects and supports the lower or return run of the belt in close contact with the periphery of the drive pulley through an arc of contact variable up to about 263°, the direct pressure exerted by the tension pulley on the belt at the point (x) of contact of the latter pulley with the belt producing the necessary friction between the belt and the drive pulley to obtain the equivalent of the frictional effect of the ordinary slack side pull of the belt, thereby reducing to zero the necessity for such pull and giving a ratio of one between the effective or H. P. pull and the total pull. Hence all the strength of the belt is available for doing useful work.

In the present instance, the tension pulley 15 is mounted on a shaft 16 which is rotatable in and between the arms 17 of a swinging yoke frame 18. This frame is pivotally mounted on a lower shaft 19 which is supported by the frame 13 rearward of the drive pulley. The arms 17 are provided with perforated upstanding lugs 20 through which extend parallel eye-bolts 21 which are pivoted, as at 22, to suitably-disposed lugs 23 on the frame 13. Encircling each of the bolts and bearing against the adjacent lugs 20 and an adjustable stop, including the nuts 24 on the bolt, is a stout spring 25 which tends to force the swinging arm, together with the tension pulley, toward the drive pulley. By manipulating the nuts to adjust the stops longitudinally of the respective bolts, the pressure of the pulley 15 can be regulated not only to meet specific requirements of belt tension, but also to relieve the spring pressure to enable the yoke and tension pulley to be swung backward out of the way for replacement of the conveyer belt, as occasion may require.

In order that the conveyer belt shall not be damaged and also to overcome the effect of differential action on account of the crowning of the drive pulley, the tension pulley, which is relatively small in diameter, includes a succession of rubber cushion rings 26 which are formed to present a concave peripheral surface conforming to the crown of the drive pulley. The basal portions of these rings are preferably reinforced with canvas 27 and embedded wires 28. The rings are laterally tapering or converging from their basal portions, as best seen in Fig. 5, so as to have capacity for independent lateral movement within limits. Hence, when the rings are pressed against the belt by the action of the springs 25, the outer acting surfaces of the rings deflect and spread over a short length the effect of the pinching action at the contact point x, thus ensuring the necessary friction between the belt and the drive pulley at this point.

To avoid the differential action between the positively and negatively crowned driving and tension pulleys, respectively, the rubber rings 26 are preferably mounted side by side upon a finished pulley body, and when they are so assembled the pulley and contacting surfaces of the rings are treated with a suitable lubricant, such as soapstone or graphite, to facilitate relative rotary movement between adjacent rings and between the rings and pulley.

When the conveyer belt is transporting sticky material some of the "fines" cling to the surface of the belt, which fines coming in contact with the tension pulley would ordinarily tend to fill up the interstices between the cushion rings, but since the circumferential spaces, as they reach and pass the contact point x, are closed and opened by virtue of the inherent elasticity of the rubber rings, the rings normally have the effect of removing any adhering material. To make certain that the spaces will be kept clean, I provide a series of scraper teeth 29 which project into the spaces and remove therefrom any material that has not normally fallen away. These teeth are preferably formed on a transversely-disposed plate 30 which is bolted to the supporting frame 13 rearwardly of and in operative angular relation to the axis of the tension pulley.

While a conveyer drive mechanism of the construction hereinbefore described embodying the principle of my invention is most advantageous as a head drive, said mechanism may be adapted to use an internal drive, (that is, a drive associated with the lower run of the conveyer belt and remote from the head) both on a non-reversing and on a reversing conveyer. For example, in Fig. 6 I have diagrammatically indicated the drive and tension pulleys 11, 15, respectively, as applied to the lower run of a non-reversing belt and have indicated a suitable idler 31 for guiding the belt to the drive pulley; and in Fig. 7 I have indicated two tension pulleys 15 as flanking the drive pulley 11, and also two idlers 31 positioned to guide the belt to the drive pulley and permit the reversal of the direction of travel of the belt while maintaining the requisite frictional contact of the belt with the drive pulley in each direction of travel of the belt.

I claim—

1. In drive mechanism for conveyer belts, the combination with a drive pulley about which a belt is flexed, of a rotary tension pulley comprising a body and a succession of peripheral rubber rings rotatably mounted on the body and co-acting with said belt and drive pulley to produce direct pressure and arcuate frictional contact between the said belt and drive pulley, and means for pressing said tension pulley against the belt.

2. In drive mechanism for conveyer belts, the combination with a drive pulley about which a belt is flexed, of a rotary tension pulley having a resilient cushion periphery co-acting with said belt and drive pulley to produce direct pressure and arcuate frictional contact between the said belt and drive pulley, and means for pressing said tension pulley against the belt.

3. In drive mechanism for conveyer belts, the combination with a drive pulley about which a belt is flexed, of a rotary tension pulley comprising a body and a succession of peripheral rubber cushion rings thereon co-acting with said belt and drive pulley to produce direct pressure and arcuate frictional contact between the said belt and drive pulley, and means for pressing said tension pulley against the belt.

4. In drive mechanism for conveyer belts, the combination with a drive pulley about which a belt is flexed, of a rotary tension pulley comprising a cylindrical body having a succession of peripheral rubber cushion rings co-acting with said belt and drive pulley to produce direct pressure and arcuate frictional contact between the said belt and drive pulley, the peripheral edges of adjacent rings being spaced from each other, and means for pressing said tension pulley against the belt.

5. In drive mechanism for conveyer belts, the combination with a drive pulley about which a belt is flexed, of a rotary tension pulley comprising a body and a succession of peripheral rubber rings thereon co-acting with said belt and drive pulley to produce direct pressure and arcuate frictional contact between the said belt and drive pulley, each of said rings being laterally tapered so that the sides of the adjacent rings are spaced from each other, and means for pressing said tension pulley against the belt.

6. In drive mechanism for conveyer belts, the combination with a crowned drive pulley about which a belt is flexed, of a rotary tension pulley comprising a body and a succession of peripheral rubber rings thereon co-acting with said belt and drive pulley to produce direct pressure and arcuate frictional contact between the said belt and drive pulley, the peripheries of said rings being shaped to present to the belt a surface conforming to the crown of the pulley, and means for pressing said tension pulley against the belt.

7. In drive mechanism for conveyer belts, the combination with a drive pulley about which a belt is flexed, of a rotary tension pulley comprising a body and a succession of peripheral rubber rings thereon co-acting with said belt and drive pulley to produce direct pressure and arcuate frictional contact between the said belt and drive pulley, the peripheral edges of adjacent rings being spaced from each other, means for pressing said tension pulley against the belt, and a scraper having teeth in register with the spaces between the rings.

Signed at New York in the county and State of New York this fifth day of October A. D. 1928.

GORDON F. DODGE.